United States Patent [19]
Focke et al.

[11] Patent Number: 5,877,506
[45] Date of Patent: Mar. 2, 1999

[54] METHOD AND DEVICE FOR MONITORING BLANKS OR REVENUE SEALS FOR CIGARETTE PACKAGES

[75] Inventors: Heinz Focke, Verden; Dietrich Below, Bülstedt, both of Germany

[73] Assignee: Focke & Co. (GmbH & Co.), Verden, Germany

[21] Appl. No.: 800,510

[22] Filed: Feb. 14, 1997

[30] Foreign Application Priority Data

Feb. 19, 1996 [DE] Germany .................. 196 05 882.1
Apr. 16, 1996 [DE] Germany .................. 196 14 920.7

[51] Int. Cl.⁶ .................. G01N 21/00; B07C 5/00
[52] U.S. Cl. .................. 250/559.2; 250/221; 250/223 R; 209/536; 53/53; 356/376
[58] Field of Search .................. 250/559.2, 221, 250/223 R; 209/587, 536, 617; 53/53; 356/376

[56] References Cited

U.S. PATENT DOCUMENTS

| | | |
|---|---|---|
| 3,035,380 | 5/1962 | Leavens . |
| 3,939,984 | 2/1976 | Butner .................. 209/74 |
| 4,053,056 | 10/1977 | Day .................. 209/587 |
| 4,972,494 | 11/1990 | White et al. .................. 209/535 |
| 5,383,322 | 1/1995 | Collins, Jr. et al. .................. 53/53 |
| 5,664,026 | 9/1997 | Neri et al. .................. 209/536 |

FOREIGN PATENT DOCUMENTS

| | | |
|---|---|---|
| 330495 | 8/1989 | European Pat. Off. . |
| 691273 | 5/1995 | European Pat. Off. . |
| 677444 | 10/1995 | European Pat. Off. . |
| 2731477 | 1/1978 | Germany . |
| 3523208 | 1/1986 | Germany . |
| 3700928 | 7/1987 | Germany . |
| 4112263 | 10/1992 | Germany . |

*Primary Examiner*—Stephone Allen
*Attorney, Agent, or Firm*—Sughrue, Mion, Zinn, Macpeak & Seas, PLLC

[57] ABSTRACT

With rapidly-operating packaging machines for cigarette packages, monitoring of blanks is becoming increasingly necessary, such a system supervising the feed of correct blanks in the correct relative position. The same applies to monitoring systems for revenue seals.

In the method according to the invention for monitoring blanks or revenue seals with the aid of a sensor, contours of an edge and of a surface of the blank or of the revenue seal are scanned. Pulses obtained thus are compared with a reference value by an evaluating unit.

19 Claims, 5 Drawing Sheets

METHOD AND DEVICE FOR MONITORING BLANKS OR REVENUE SEALS FOR CIGARETTE PACKAGES

BACKGROUND OF THE INVENTION

The invention relates to a method for monitoring blanks for cigarette packages or revenue seals on cigarette packages, particularly on flip-top packages, a blank or a portion thereof or a revenue seal being detected by a sensor and the sensor signal thus obtained being passed to an evaluation unit.

Flip-top packages are extremely widely used as a packaging for cigarettes. They are also named "hinge-lid" packs. As a rule Such flip-top packs are manufactured in an appropriate packaging machine from a blank which is in one piece as far as the collar. In the production flow it is necessary for the correct blank always to be passed in the proper relative position to the packaging machine. For this purpose the packaging machine must have a rapidly-acting blank monitoring system, which on the one hand monitors the supply of the correct blank when there is a change in the type of packaging to be manufactured, and on the other hand monitors its correct positioning. The same applies in the attachment of revenue stamps to cigarette packages.

SUMMARY OF THE INVENTION

Accordingly, the problem underlying the invention is to provide a rapidly and reliably operating method for monitoring blanks for cigarette packages or revenue stamps on cigarette packages, and a corresponding device.

In order to solve this problem, contours of an edge and/or of a surface of the blank or of the revenue stamp are scanned, the sensor signal thus obtained is filtered in order to determine a contour signal, the contour signal then being converted into digital pulses, and these pulses are compared with a reference value. The method according to the invention has the advantage that it is not the entire image of the blank or of the revenue stamp which is processed, but only its contours. Thus the pulses obtained from transitions from light to dark in the blank or in the revenue stamp are counted, and then compared with the reference value. Therefore the blank of the revenue stamp can be checked with minimal outlay and in a short period of time for its corresponding requirements. The performance of the packaging machine is not thereby impaired.

Preferably, line start signals, which are filtered out of the sensor signal with the aid of a synchronising unit, are passed to control units. In this way the right-hand and left-hand vertical sides of an image to be captured can be screened out. This has the advantage that a scanning area can be adapted to the vertical width of the blank or part thereof to be scanned. In this way the information to be evaluated can always be adapted to the blank size. The screenout areas are in fact also detected, yet are excluded for counting of the pulses, and are thus not evaluated.

The device according to the invention is characterised by a filter unit, which is incorporated downstream of the sensor in the signal flow direction, and filters out a contour signal from a sensor signal detected by the sensor, and by means of a signal converter which is incorporated downstream of the filter unit in the signal flow direction, and is incorporated upstream of the evaluation unit in the signal flow direction, and which converts the contour signal into pulses, which are evaluated in the evaluation unit. The device according to the invention has the advantage that it enables, with a low output on device technology, a rapid and reliably operating blank monitoring system.

BRIEF DESCRIPTION OF THE PREFERRED EMBODIMENT

A preferred embodiment of the invention, given by way of example, is explained in more detail with reference to the drawing, which shows:

FIG. 1: a detail of a turret folder of a packaging machine in the region of a device according to the invention, in schematic plan view;

FIG. 2: a cross-section through the turret folder according to the section line II—II in FIG. 1;

FIG. 3: a block diagram of the device according to the invention;

FIG. 4: an extremely schematic plan view of an area of a blank to be scanned by a sensor;

FIG. 5: the area of the blank according to FIG. 4 in an extremely schematic side elevation;

FIG. 6: a sensor signal after scanning the blank area according to FIG. 4 and FIG. 5;

FIG. 7: a contour signal obtained after filtering the sensor signal according to FIG. 6;

FIG. 8: the contour signal according to FIG. 7, converted into digital pulses, and FIG. 9: the pulses according to FIG. 8 in a scanning area to be evaluated.

DETAILED DESCRIPTION OF THE DRAWINGS

Figure 1:
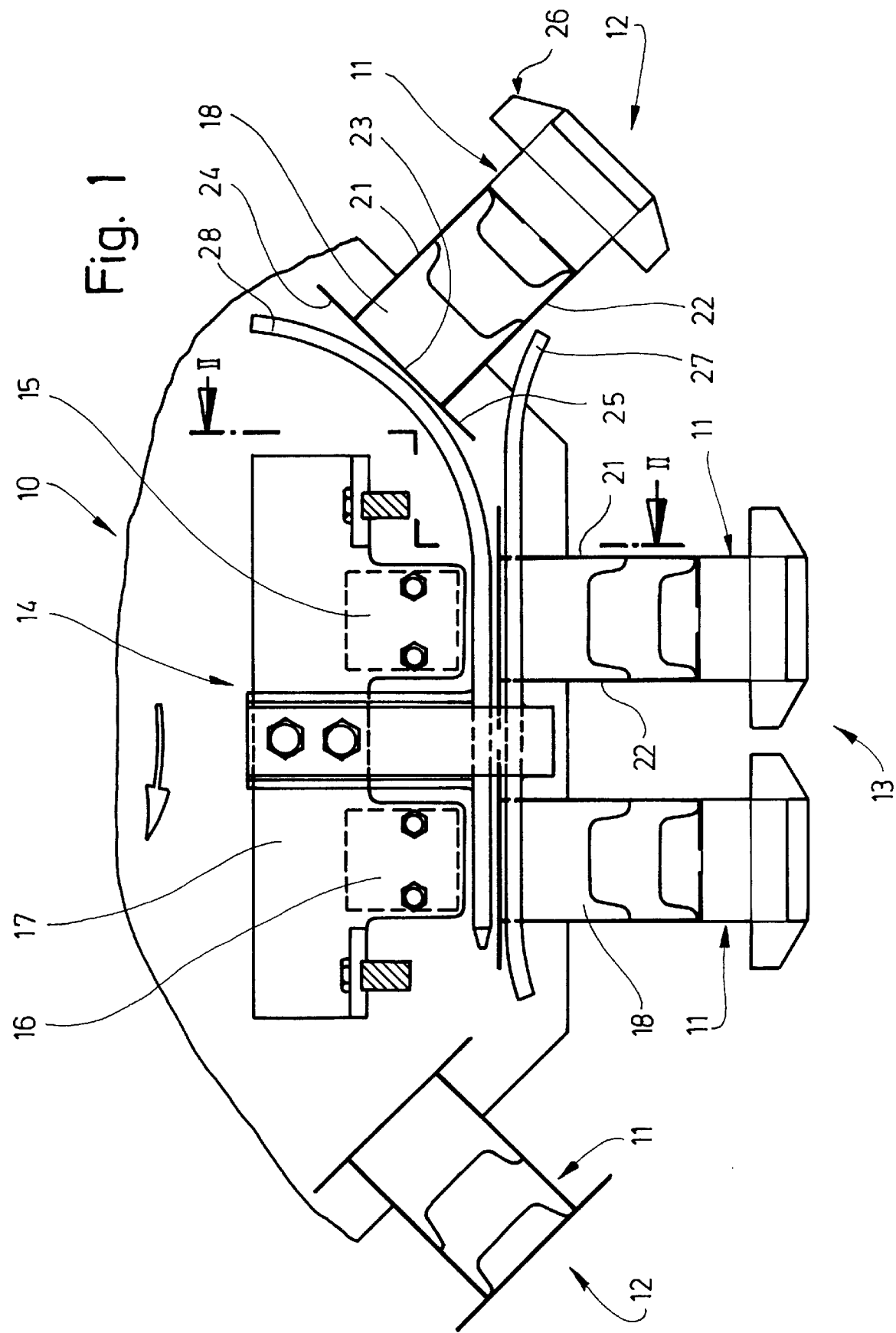

The device shown in the drawing serves to provide rapid and reliable blank monitoring in a packaging machine for cigarette packs, i.e. hinge-lid packs.

Figure 2:
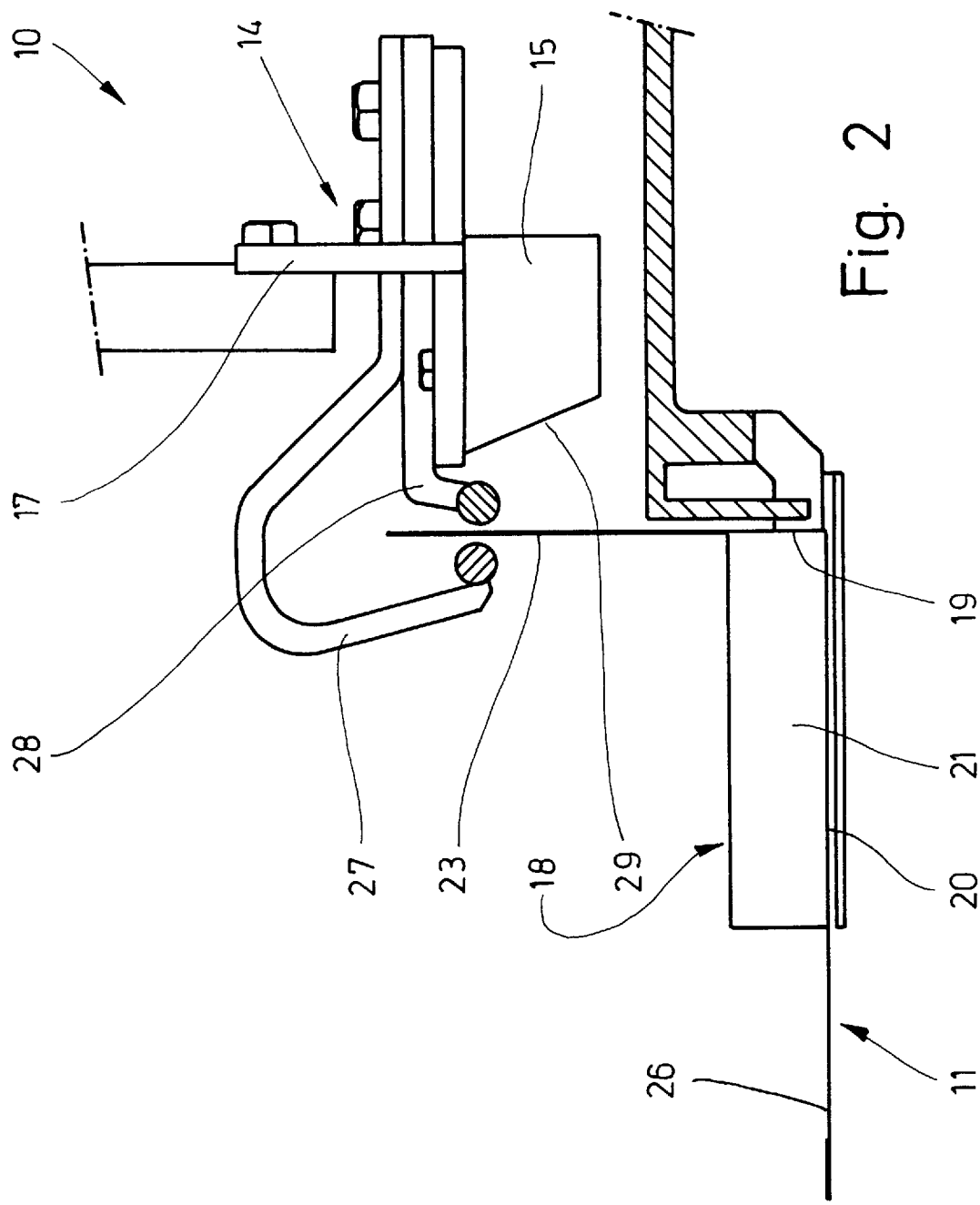

FIG. 1 and FIG. 2 show details of a turret folder 10. The turret folder 10 serves for periodic folding of a blank 11 into the shape of a hinge-lid pack to be produced. For this purpose the blank 11 is periodically fed to individual folding stations 12, located along an arcuate curve, of the turret folder 10.

In a region 13 between two folding stations 12 of the turret folder 10 there is located a device 14 for monitoring the blanks 11. The device 14 has two sensors 15, 16 located next to one another. The sensors 15, 16 are in the form of CCD cameras. Each sensor 15, 16 is located, together with an infra-red light-emitting diode (not shown in FIGS. 1 and 2), in a housing. This ensures that the sensors 15, 16 can be operated in darkness.

The sensors 15, 16 are located in a common vertically-adjustable sensor holder 17. This ensures that the device 14 can be adapted to various formats of hinge-lid packs to be produced.

The blank 11, partly folded around a cigarette block 18, is passed to the device 14 in the position shown in FIG. 2. In this case only the base wall 19, rear wall 20 and inner side flaps 21, 22 of the blank 11 are brought into the correct folding position about the cigarette block 18. The front wall 23 and outer side flaps 24, 25 as well as the entire lid 26 of the blank 11 are still in an unfolded position.

The device 14 now serves to monitor the still unfolded, upstanding front wall 23 of the blank 11. Guide elements 27, 28 here serve for exact positioning of the front wall 23 in front of the sensors 15, 16.

An observation window 29 of the sensors 15, 16 is aligned obliquely downwards, in order to avoid dust deposits on the observation window 29.

Figure 3:
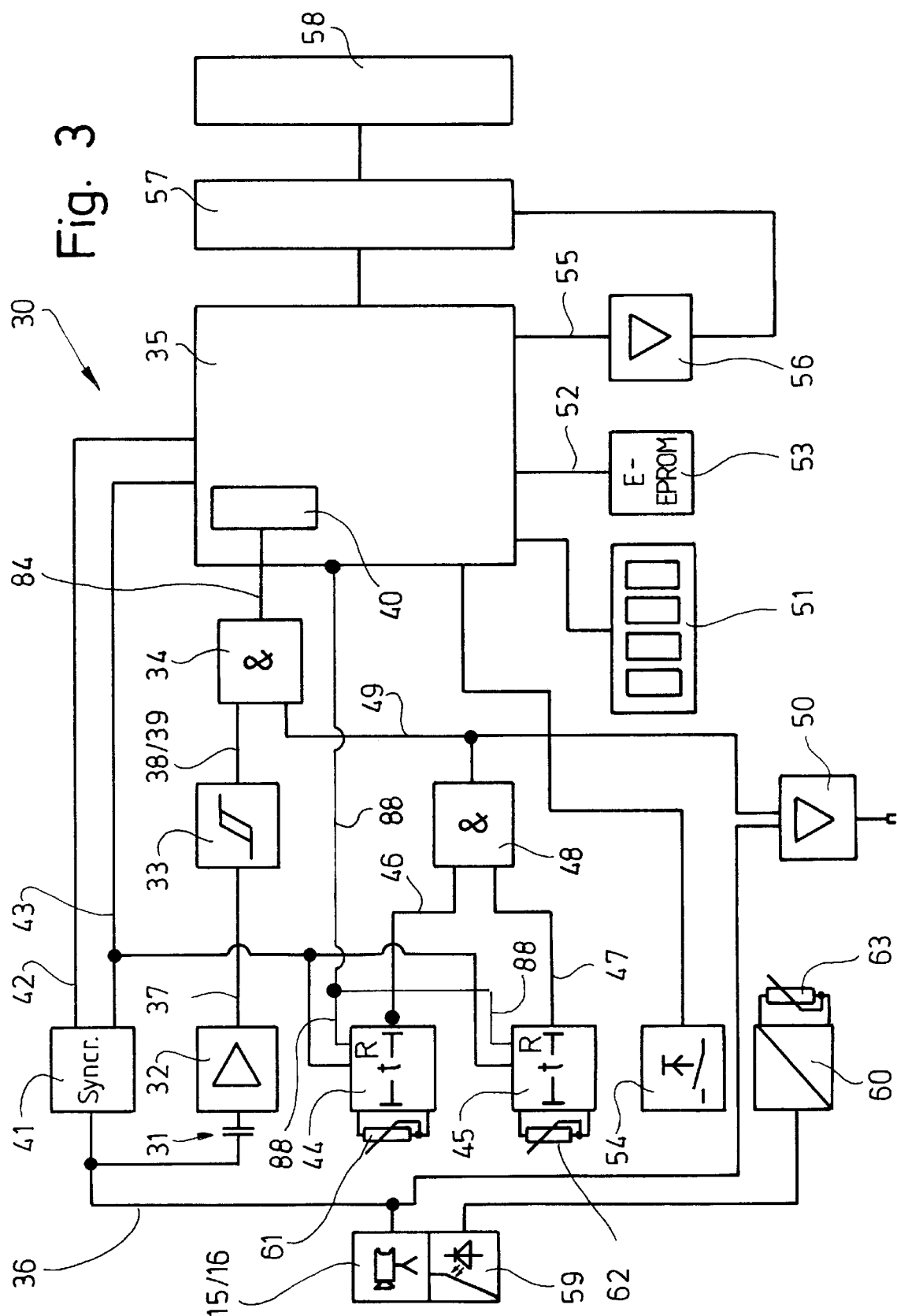

A circuit diagram 30 of the device according to the invention for monitoring the front wall 23 of the blank 11 is shown in FIG. 3. The sensors 15, 16 are connected to a filter unit 31. The filter unit 31 is incorporated downstream of the sensors 15, 16 in the signal flow direction. The filter unit 31 is a condenser and causes de-coupling of direct current. A video amplifier 32 is incorporated downstream of the filter unit 31. The video amplifier 32 is connected by a signal converter 33 and a switch member 34 to an evaluation unit 35. The signal converter 33 is in the form of a comparator with hysteresis, and the switch element 34 as a logical "AND". The evaluation unit 35 involves a microcontroller. Accordingly, a sensor signal 36 received by the sensors 15, 16 is passed, after direct-current decoupling, to the video amplifier 32. A contour signal 37 obtained by the direct-current decoupling and amplified by the video amplifier 32, is converted by the signal converter 33 into a digitised signal 38, i.e. into digital pulses 39. These are then passed via the switch element 34 to the evaluation unit 35, particularly to a counter 40 integrated in said evaluation unit 35.

The sensor signal 36 is passed, along with the filter unit 31, to a synchronising unit 41. Accordingly, the same input signal, i.e. the sensor signal 36, is passed through the synchronising unit 41 and filter unit 31. The synchronising unit 41 filters out of the sensor signal 36 two output signals, i.e. an image start signal 42 and a line start signal 43. The image start signal 42 and line start signal 43 are passed to the evaluation unit 35. Moreover, the line start signal is passed to two control units 44, 45. The control units 44, 45 are in the form of time function elements. Output signals 46, 47 from the control units 44, 45 are passed to a switch element 48, whose output signal 49, together with the signal 38, serves as input signals for the switch element 34. Like the switch element 34, the switch element 48 is also in the form of a logical "AND".

The output signal 49 of the switch element 48 and the sensor signal 36 are also passed to a video amplifier 50 as input signals. A monitor (not shown) can be connected to the video amplifier 50 in order to render the monitoring procedure visible. Areas of the blank 11 to be scanned which are not to be evaluated, which will be discussed in more detail later, appear during this visualisation darker on the monitor than the areas of the blank 11 to be evaluated.

The pulses 39 of signal 38 passed by the switch element 34 to the evaluating unit 35 and evaluated thereby can be shown on a display 51 in terms of their number. In the evaluating unit 35 the counted pulses 39 are compared with a reference value 52. The reference value 52 is stored in an external memory 53 of the evaluating unit 35. The reference value 52 stored in the memory 53 is formed from reference measurements. Serving for this purpose is an actuating element 54, with the aid of which it can be shown that the pulses 39 obtained from the sensor signal 36 are reference measurement values which are intended to be used to calculate the reference value 52.

In dependence on the comparison carried out by the evaluating unit 35 between reference value 52 and the number of pulses 39, an output signal 55 is generated which is passed via an amplifier 56 to a machine control system 57. The machine control system 57 is directly connected to elements of a packaging machine which, in the case of a corresponding output signal 55, will exclude a faulty blank or a faulty hinge-lid pack from the production flow. Further, the machine control system 57 is connected to a central control unit 58. The central control unit 58 contains reference values of various blanks. When the cigarette package to be produced is changed, and thus when the blank to be processed is changed, the central control unit 58 and the machine control unit 57 communicate with one another. The corresponding reference value is passed by the control unit 58 to the machine control system 57, the latter transfers the reference value to the evaluating unit 35, where it is then stored in the memory 53.

FIG. 3 also shows the lighting element 59 located together with the sensors 15, 16 in a casing. The lighting element 59 is in the form of an infra-red light-emitting diode. The lighting element ensures that the sensors 15, 16 can be operated in darkness. The light intensity of the lighting element 59 can be adapted by a regulator 60 to the object to be scanned. This ensures that the device 49 can be operated independently of the light conditions at any moment and of the respective blank to be scanned. The design of the lighting element 59 as an infra-red diode has the advantage that the latter have a long lifespan in comparison to previously known incandescent lamps. Thus a long life duration of the device according to the invention is achieved.

The control units 44, 45 and the regulator 60 may be adapted by trimmers 61, 62, 63 associated therewith, if necessary individually, to the physical monitoring of a blank.

Figure 4:
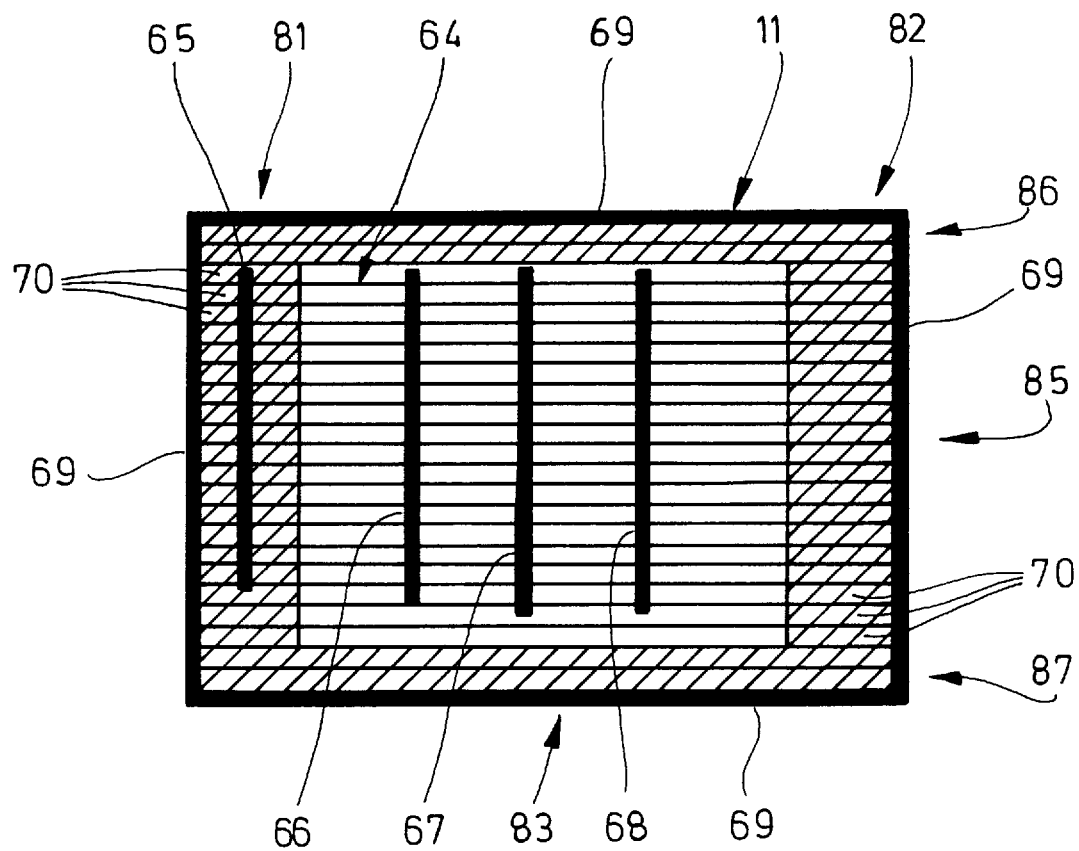
Figure 5:
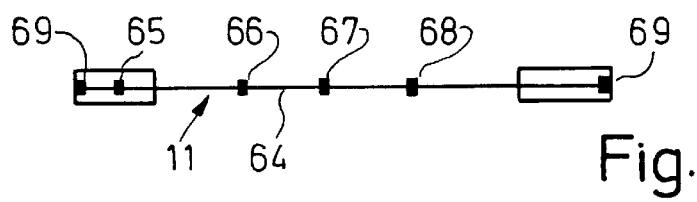

Details of the method according to the invention will now be discussed in connection with FIGS. 4 to 9. An area 64 of the blank 11 to be scanned by the sensors 15, 16 has four vertically-arranged strips 65, 66, 67, 68 and a border 69. The horizontally-extending lines 70 shown in FIG. 4 illustrate the line-by-line scanning of the area 64 or blank 11 by the sensors 15, 16.

Figure 6:
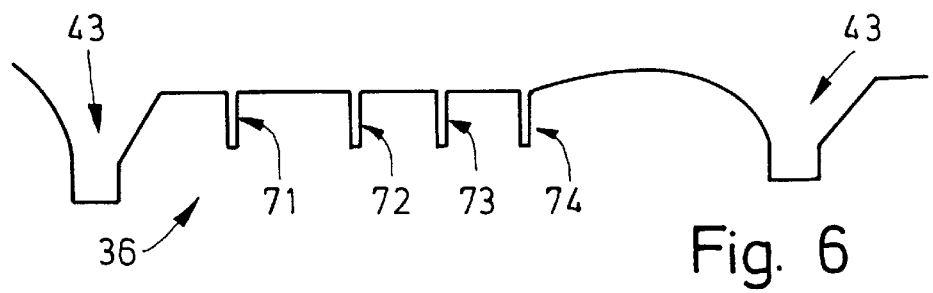
Figure 7:
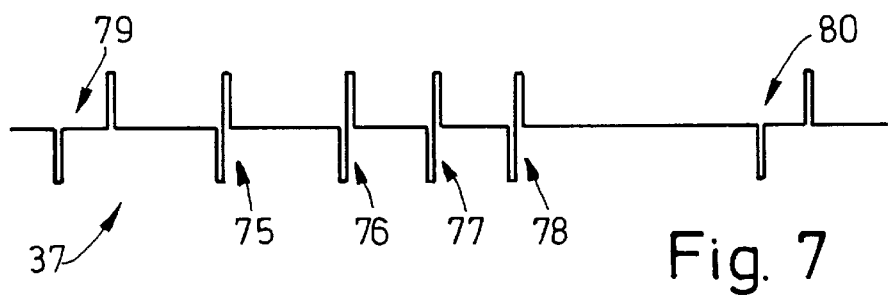
Figure 8:
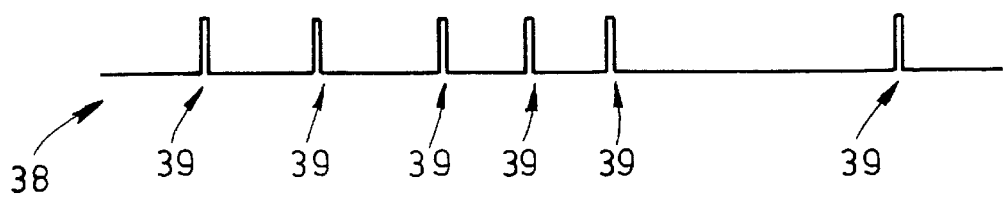
Figure 9:
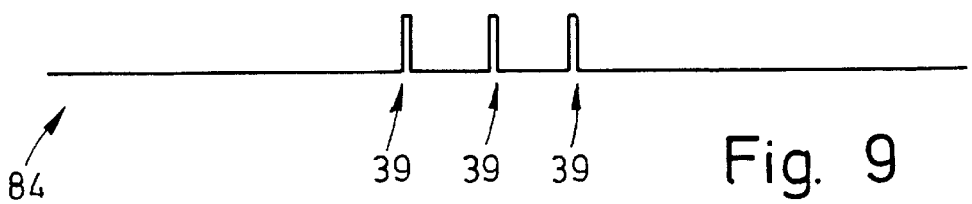

During the line-by-line scanning of the area 64 by the sensors 15, 16 the sensor signal 36 is obtained lineby-line (FIG. 6). The sensor signal 36 of each line contains the line start signal 43 and for each scan strip 65, 66, 67, 68 a corresponding signal 71, 72, 73, 74. The sensor signal 36 according to FIG. 6 is then, with the aid of the filter unit 31 in the form of a condenser, subjected to direct-current decoupling. Then the signal thus filtered is amplified via the video amplifier 32. The contour signal 37 thus obtained reproduces only the contour component of the area 64 in the form of voltage peaks 75, 76, 77, 78. This has the advantage that the subsequent signal evaluation is almost insensitive to fluctuations in light intensity. The contour signal 37 accordingly only now consists of the voltage peaks 75 .. 78, which are proportional to the strips 65 .. 68 and thus to the contours of the area 64. In addition, the contour signal 37 contains voltage peaks 79, 80 as a result of the respective line start signals 43.

The contour signal 37 thus obtained is then converted by the signal converter 33 in the form of a comparator with hysteresis characteristic into the digital signal 38. The signal converter 33 converts each voltage peak 75 .. 80 contained in the contour signal 37 into a digital pulse 39. This digital signal 38 with pulses 39 is then passed to the switch element 34.

In addition to the evaluation of the sensor signal 36 shown above, the same is also passed to the synchronising unit 41. The synchronising unit filters the line start signals 43 of each line out of the sensor signal 36. The line start signals 43 are then passed in digital signal form to the control units 44, 45 in the form of time function elements. With the aid of the control unit 44 and of the control unit 45, signals received by sensor 15, 16 can be screened out at line start and at line end. The control unit 44 accordingly serves to screen out a first vertical area 81 at the line start of the sensor signal 36. The control unit 45 enables a second vertical area 82 at the line end of the respective sensor signal 36 to be screened out. Thus there is defined a vertical scanning area 83 of the blank area 64, which contains the actual information to be scanned and thus to be evaluated.

In addition to the vertical scanning area 83, a horizontal scanning area 85 may also be set. The horizontal scanning area 85 is determined by the evaluating unit 35 with the aid of the image start signal 42 supplied thereto. For this purpose the evaluating unit 35 transmits a control signal 88 for screening out an area 86 of an image start and of an area 87 of an image end to the control units 44, 45. Accordingly, with the aid of the evaluating unit 35 and control units 44, 45, complete lines are screened out of the evaluation in the area 86 of the image start and in the area 87 of the image end. The number of lines to be screened out in the areas 86 and 87 may be set with the aid of a switch which is not shown. Associated with each switch position in the evaluating unit 35 are two values. A first value determines from which line the counter 40 is released, a second value determines from which line the counter 40 is blocked.

Thus only those pulses 39 are evaluated which lie within the horizontal scanning area 85.

Accordingly, by means of the output signal 49, which fixes the vertical scanning area 83 and horizontal scanning area 85, and which with the digital signal 38 is passed to the switch element 34 as an input signal, the digital pulses 39 falling into the scanning areas 83, 85 are screened out of the signal 38. The output signal 84 of the switch element thus obtained accordingly contains only the pulses 39 belonging to the strips 66, 67, 68 in the scanning areas 83, 85. These pulses 39 are passed to the evaluating unit 35 for further detection and evaluation.

The counter 40 of the evaluating unit 35 counts the pulses 39 of the output signal 84 and displays the counter condition on the display 51. In addition the evaluating unit 35 compares the counter condition of counter 40 with the reference value 52. When the reference value 52 is exceeded, the output signal 55 is set, which is passed via the amplifier 56 to the machine control system 57. Elements of the packaging machine in connection with the machine control 57 then separate the faulty blank 11 from the production flow.

The reference value 52 is determined in a "doubleteach-method". In this case two counter values of the counter 40 are received, i.e. a counter value for a proper blank 11 and a counter value for an improper blank 11. Both counter values are determined in this case over a plurality of measurements. The counter value for the proper blank 11 accordingly represents the first teach, the countervalue for the improper blank the second teach. The evaluating unit 35 calculates from both counter values the reference value 52 to be stored in the memory 53. The "double-teachmethod" has the advantage that in blank monitoring a large safety switching margin can be maintained. Thus large tolerances can be accepted.

The image start signal 42 filtered out of the sensor signal 36 by the synchronising unit 41 serves to determine a start for a scanning cycle. If accordingly an image start signal 42 is transmitted to the evaluating unit 35, a counting cycle is started. The previously received counter condition is compared with a reference value 52 and if necessary the output signal 55 is set.

In order to ensure that the same area for scanning is always evaluated by the evaluating unit 35, the blank 11 to be scanned must always remain in front of the sensors 15, 16 for two scanning cycles. During this delay period it is ensured that the whole blank 11 is always scanned.

By means of the device described above and by means of the method described above, accordingly, the blank 11 may be monitored for a plurality of properties. Thus the contours of the edge of the blank 11 and the surface of the blank 11 may be scanned and evaluated. From the contours of the edge of the blank 11 it can be checked whether the blank 11 is in the correct position in the machine. It can be checked from the contours of the surface of the blank 11 whether the blank 11 carries the correct printed message on its surface for the type of cigarette to be produced.

The device according to the invention and the method according to the invention may also be used to monitor revenue seals attached to a ready-folded hinge-lid pack. In this case contours of an edge and of a surface of the revenue seal are likewise scanned and the pulses thereby obtained compared in the evaluating unit 35 with a reference value. Details to this effect can be seen in the description of FIGS. 3 to 9. In order to monitor revenue seals, the device according to the invention is located in the vicinity of a packaging machine for applying an external covering of transparent foil, polyfoil or the like. Immediately after the hinge-lid pack is combined with the outer covering of transparent foil or the like, the revenue seal is monitored. Thus slipping of the revenue seal during application of the outer cover may if necessary be detected. In order to avoid repetition, reference is made to the monitoring of blank 11 already described,

We claim:

1. A method for monitoring blanks for cigarette packs or revenue seals on cigarette packages, wherein a blank (11) or a portion thereof or a revenue seal or an edge or a surface of the blank or of the revenue seal is scanned by a sensor (15, 16) in order to detect a sensor signal (36), comprising the steps of:
   a) deriving a contour signal (37) from the sensor signal;
   b) converting the contour signal into digital pulses (39), and
   c) comparing said pulses with a reference value (52) in an evaluating unit (35).

2. A method according to claim 1, wherein the reference value (52) is determined from a plurality of reference measurements and is stored in the evaluating unit, and when the reference value is exceeded or underachieved, an output signal (55) is generated and fed to a machine control system (57).

3. A method according to claim 16, wherein the cigarette packages are hinge-lid packs.

4. A method according to claim 1, wherein the sensor signal is filtered to derive the contour signal.

5. A method according to claim 4, wherein the filtering is implemented by direct-current decoupling.

6. A method according to claim 1, wherein the sensor signal is fed to a synchronizing unit (41) which filters image start signals (42) and line start signals (43) out of the sensor signal.

7. A method according to claim 6, wherein the image start signals and line start signals are fed to the evaluating unit (35), and a first, horizontal scanning area (85) is defined with the image start signals.

8. A method according to claim 7, wherein a scanning cycle is started with the image start signal.

9. A method according to claim 7, wherein the line start signals are fed to two control units (45, 44), and a second, vertical scanning area (83) is defined with the line start signals.

10. A method according to claim 9, wherein only digital pulses (39) falling in the first or second or both scanning areas are evaluated and compared with the reference value.

11. A device for monitoring blanks for cigarette packages or revenue seals on cigarette packages with a sensor (15, 16) and an evaluating unit (35), comprising:
   a) a unit (31) disposed downstream of the sensor in a sensor signal flow direction, for deriving a contour signal (37) from a sensor signal (36) output by the sensor, and b) a signal converter (33) disposed downstream of the unit in the signal flow direction and upstream of the evaluating unit, for converting the contour signal into digital pulses (39) which are compared in the evaluating unit (35) with a reference value.

12. A device according to claim 11, disposed between two folding stations (12) of a turret folder (10) for monitoring blanks.

13. A device according to claim 11, disposed in the region of a packaging machine applying an external covering of transparent foil or the like, for monitoring revenue seals.

14. A device according to claim 11, wherein the cigarette packages are hinge-lid packs.

15. A device according to claim 11, wherein the unit is filter unit for filtering the contour signal (37) out of the sensor signal (36).

16. A device according to claim 15, wherein the filter unit is a condenser, and the signal converter is a comparator having a hysteresis characteristic.

17. A device according to claim 15, further comprising a synchronizing unit (41) disposed downstream of the sensor such that the synchronizing unit and the filter unit receive the same sensor input signal, the synchronizing unit filtering image start signals (42) and line start signals (43) out of the sensor signal.

18. A device according to claim 17, further comprising two control units (44, 45) disposed downstream of the synchronizing unit and in parallel with one another, outputs of the control units being connected to one another by a first switch element (48), and the control units defining horizontal and vertical scanning areas (83, 85) with the aid of synchronizing signals.

19. A device according to claim 18, further comprising a second switch element (34) disposed between the signal converter and the evaluating unit having inputs connected to outputs of the signal converter having the first switch element.

* * * * *